United States Patent [19]

Bunge

[11] 4,066,595
[45] Jan. 3, 1978

[54] WATER-SOLUBLE DYE COMPOSITION

[75] Inventor: Hans-Henning Bunge, Suffern, N.Y.

[73] Assignee: Ciba-Geigy Corporation, Ardsley, N.Y.

[21] Appl. No.: 585,990

[22] Filed: June 11, 1975

[51] Int. Cl.² .............................................. C08L 61/28
[52] U.S. Cl. .................................. 260/29.4 R; 8/41 B;
   8/42 R; 8/82; 106/237; 106/238; 260/22 T;
   260/29.2 E; 260/29.6 MN; 260/29.6 ME;
   260/DIG. 38
[58] Field of Search ............. 260/29.6 ME, 29.6 MN,
   260/29.6 MM, 42.21, 29.4 R, 97, DIG. 38, 39
   P; 106/308 Q, 237, 238; 8/42 R, 41

[56] References Cited

U.S. PATENT DOCUMENTS

| 2,879,266 | 3/1959 | Anderson | 260/42.21 |
| 3,551,170 | 12/1970 | Kuster | 106/22 |
| 3,829,287 | 8/1974 | Litke | 8/42 R |

FOREIGN PATENT DOCUMENTS 1,207,520  10/1970  United Kingdom.

Primary Examiner—Theodore E. Pertilla
Attorney, Agent, or Firm—Vincent J. Cavalieri

[57] ABSTRACT

A water-soluble dye containing composition which comprises of a dye which is soluble in a water-miscible solvent and is insoluble in water alone, a water-miscible solvent and a water-soluble resin. These compositions may be prepared by first dissolving a dye in a water-miscible solvent and thereafter adding the dye solution to an aqueous solution of a resin. The resulting compositions are useful to color aqueous resin emulsions.

14 Claims, No Drawings

WATER-SOLUBLE DYE COMPOSITION

BACKGROUND OF THE INVENTION

1. Field of the Invention

This invention relates to water-soluble dye compositions which may be used to prepare inks, coatings and wood stains. The compositions of this invention incorporate a solvent soluble dye which is insoluble in water along, but is soluble in the hereinafter described aqueous compositions.

2. The Prior Art

Dyes soluble in polar solvents have mainly been used in non-aqueous gravure or flexographic inks and paints. The dyes were incorporated by direct addition of the dye to the fluid ink or to the paint or by predissolving the dye in suitable solvents followed by direct addition to the ink or paint. A short agitation period provided a uniformly colored system.

For aqueous inks and paints, based on either water-soluble resins or emulsions, either water-soluble dyes or aqueous pigment dispersions were used to achieve coloration.

This invention makes it possible to use dyes for auqeous systems which dyes are initially incompatible with water but soluble in polar solvents.

SUMMARY OF THE INVENTION

The dyes which may be used to prepare the compositions of this invention are those which are soluble in solvents which are soluble in water or a solvent mixture which contains a large portion of water-miscible solvents. The dyes by themselves are insoluble in water.

The dye is dissolved in a water-miscible solvent. The solution is added to an aqueous resin solution. The resin will have a solubilizing effect on the dye, preventing precipitation of the dye which would not be water-miscible or water-soluble in water alone. It has also been found that the dye may also be made water-soluble by adding the solvent soluble dye to a resin solution in organic solvents which are miscible with water. Water then may be added to this solution yielding water-soluble dye compositions.

The water-soluble compositions of this invention comprise a. 0.01% to 40% of a dye which is soluble in water-miscible solvents and insoluble solely in water;

b. 1.0% to 88% of a water-miscible solvent or mixture of solvents which is inert to said dye;

c. 0.1% to 89% of a water-soluble resin; and d. 10% to 98% water.

With respect to the water insoluble dyes which are suitable for the compositions of this invention are those which are known to persons skilled in the art as solvent dyes, as indicated in the Colour Index as published by the Society of Dyers and Colourists (Great Britain) and by the American Association of Textile Chemists and Colorists. This invention applies to dyes in this class which are soluble in water-miscible solvents.

Among the suitable dyes for use in the practice of this invention are those sold, for example, by CIBA-GEIGY Chemical Corporation, under the trade names Orasol, Oracet and Irgacet; by the American Cyanamid Company under the trade name Calcofast Spirit; by Badische Anilin and Soda Fabrik A.G., under the trade name Neozapon; by the Sandoz Colors and Chemical Company under the trade name of Acetosol; by the G.A.F. Corporation under the trade name Azosol Fast; by E. I. du Pont de Nemours & Co. under the trade name Luxol.

Most specifically, among the most preferred solvent dyes which are listed in the Colour Index which may be used in the compositions of the instant invention are C.I. Solvent Yellows 13, 23, 25, 48, 62, 63, 64, 78, 81, 82, 88, 89 and 95; C.I. Solvent Oranges 9, 11, 20, 27, 41, 54, 56 and 59; C.I. Solvent Reds 7, 8, 9, 31, 33, 35, 90, 91, 92, 106, 115, 118, 119, 122, 125, 127, 130, 131 and 132; C.I. Solvent Violets 1 and 14; C.I. Solvent Blues 38, 45, 46, 48, 49, 53, 67 and 70; C.I. Solvent Browns 28, 31, 34, 35, 38, 42, 43 and 44; C.I. Solvent Blacks 2, 6, 26, 27, 28 and 29.

The C.I. Solvent Blue 38 has the C.I. Constitution No. 74180, having the formula

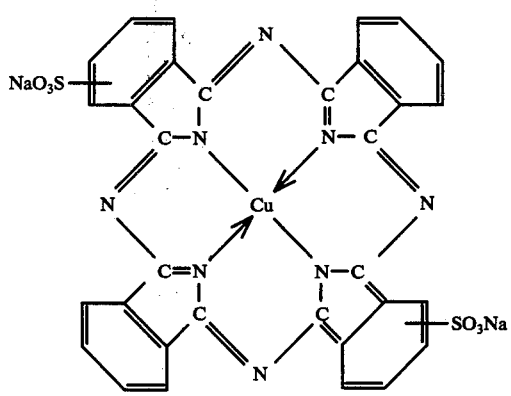

Red 31 (C.I. Constitution 27306) which is the dicyclohexylamine salt of the compound having the formula

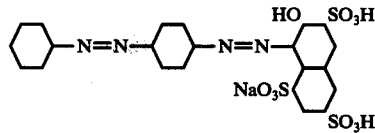

Red 8 (C.I. Constitution 12715) having the formula a chromium complex of

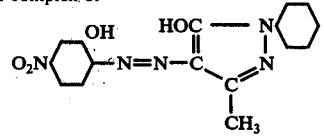

Violet 1 (C.I. Constitution 12196) which is the cobalt salt of the compound having the formula a chromium complex of

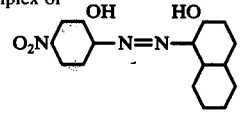

Orange 9 (C.I. Constitution 11005) having the formula

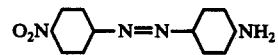

The most preferred among the above mentioned water insoluble solvent soluble dyes are the metal complex azo dyes, and more preferably, the cobalt, nickel, chromium, and copper metal complex azo dyes.

A wide variety of solvents may be used with the water-soluble dye compositions of the present invention. The solvents must be essentially non-reactive to other components of the composition and must be water-miscible. The dyes of the composition must also be soluble in this organic solvent, which by itself does not react with the other dyes.

Among the most suitable solvents are the alkanones, such as, acetone, methylethyl ketone, methyl isobutyl ketone, etc.; alkanoles, such as methanol, ethanol, propanol, etc.; alkoxy-alkanols, such as methyl cellosolve, ethyl cellosolve, etc.; alkoxy-esters, such as cellosolve acetates, etc.; aminoalkanols, such as dimethylaminoethanol, 2-amino-2-methyl-1-propanol, triethanol amine, trimethanol amine, etc.,; and alkylene glycols, such as methylene glycol, ethylene glycol, propylene glycol, etc.

The resin components of this invention are those resins which are soluble in water. Among those which are suitable are polyacrylic resins, aminoplast resins, rosins, polyesters, styrene-maleic, alkyd resins, etc.

With respect to the aminoplast resins, what is meant by this term are low molecular weight water-soluble condensation products or aldehyde reaction products of compounds reactable with aldehydes, such as, aminotriazine or melamine. The most preferred aminoplast is selected from the group of water-soluble potentially thermosetting polymethyl ethers of polymethyl melamines such as hexamethoxymethylmelamine as described in U.S. Pat. No. 2,906,724. The nitrogen resin precurser, hexamethoxymethylmelamine is available commercially as Cymel 303 from American Cyanamid. Other amino plast which may be used are water-soluble, low molecular weight condensation products formed from such aldehydes as formaldehyde, acetaldehyde, crotonaldehyde, benzaldehyde, and the like with such compounds as urea, ethylene urea, and aminotriazine.

With respect to the polyacrylate resins, among the most preferred are those water-soluble polymers described in U.S. Pat. No. 2,906,724. Such copolymers are water-soluble salts prepared from an $\alpha$, $\beta$-ethylenically unsaturated carboxylic acid and an alkyl ester of an $\alpha$, $\beta$-ethylenically unsaturated monocarboxylic acid. Among the $\alpha$, $\beta$-unsaturated carboxylic acids which may be used to prepare the polyacrylic copolymers are such acids as acrylic acid, methacrylic acid, crotonic acid, maleic acid, fumaric acid, and the like. With respect to the alkyl esters of the $\alpha$, $\beta$-unsaturated monocarboxylic acids which may be used to prepare the polyacrylic copolymers are methylacrylate, ethylacrylate, propylacrylate, butylacrylate, butylcrotonate and the like.

The term "rosins" refers to the resinous materials that occur naturally in the oleoresin of pine trees mainly consisting of abietic acid as well as derivatives thereof including rosin esters, modified rosins such as fractionated, hydrogenated, dehydrogenated and polymerized rosins, modified rosin esters, salts, and the like. These materials are fully described in the Kirk-Othmer Encyclopedia, supra, Volume 17, Pages 475 to 505.

The compositions of this invention may be prepared by first dissolving the dye in the organic solvent which is miscible with water. This dye solution may then be added to the resin system dissolved in water.

The compositions may also be prepared by first dissolving the dye in a solvent solution containing the resin. Water may then be added to this resin solution.

More specifically, the method for preparing the water-soluble dye compositions for this invention comprises 1. dissolving a dye in water-miscible solvent, said dye being characterised in the Colour Index as a solvent soluble dye and one which is insoluble solely in water.

2. adding said dye solution to a solution containing a water-soluble resin dissolved in water; or 1. dissolving a dye and water-soluble resin in a water-miscible solvent, said dye being characterised in the Colour Index as a solvent soluble dye and one which is insoluble solely in water.

2. adding water to the dye solution.

In both methods, the amounts of dye, resin, water and solvent are adjusted in order to obtain the concentrations described hereinbefore.

It has also been found advantageous to add up to about 10% by weight a basic material to the dye solution in order to raise the pH of the solution to about 10. The basic materials may be organic and inorganic in nature and are not reactive in a detrimental way with the components of the composition. Basic materials which may be used include ammonium hydroxide, morpholine, dimethylaminoethanol, triethanolamine, diethanolamine 2-amino-2-methyl-1-propanol and the like.

By water insoluble dyes as hereinbefore defined are also meant those dyes which are slightly soluble in water but are considered by those skilled in the art to be water insoluble dyes. Such dyes are slightly soluble in water but have no utility as a water-soluble dye due to the minor extent of solubility in water alone.

Other ingredients may be used in the compositions, for example, surfactants and stabilizers such as antioxidants, etc.

It has also been found, and as a further embodiment of this invention, that by the addition of a surfactant and a basic material as described hereinbefore, such as dimethylaminoethanol, triethanolamine, diethanolamine, ammonium hydroxide, morpholine, 2-amino-2-methyl-1-propanol to increase the pH to about 10, to a solution containing the water-miscible solvents and dyes as hereinbefore mentioned, the dye solutions become water-miscible. This composition can also be added to emulsions such as acrylic resin emulsions without causing an agglomeration of the emulsion or precipitation of the dye. Compositions of this embodiment contain from 0.01% to 40% dye, from 0.1% to 60% surfactant, from 0.1% to 89% base and the remainder a water-miscible solvent such as ethyl cellosolve or water alone. These aqueous solutions can be used as wood stains. Slight precipitation which might occur during storage may be redissolved by slight agitation.

It has also been found, and as a further embodiment of this invention that certain of the solvent soluble dyes described hereinbefore can be made water-soluble by first dissolving the dye in a water-miscible solvent, such as described previously, and adding water to the solution.

Not all the solvent dyes mentioned hereinbefore are suitable to prepare soluble dye compositions comprising a water-miscible solvent, solvent dye and water.

However, the following dyes, when dissolved in the hereinbefore mentioned water-miscible solvents, are found to be compatible with water even in the absence of a water-soluble resin or surfactant. These dyes, which are those listed in the Colour Index, are Solvent Yellows 13 and 95, Solvent Orange 9, Solvent Reds 130, 33 and 9, Solvent Browns 42, 34, 43 and 44, Solvent Blacks 29, 6 and 2. These dyes are sold by CIBA-GEIGY Chemical Corporation under the trade names Orasol and Irgacet dyes. The compositions of this embodiment contain from 0.1% to 19% dye, from 9.9% to 80% solvent and from 1% to 90% water.

The dyes are first dissolved in a water-miscible solvent. Water is then added to the dye solution.

Each of the compositions described in the embodiments of this invention may be used to color aqueous resin emulsions.

The resin emulsion such as polyacrylic, polyvinylacetate, styrene-butadiene and the like consists of a fluid in which small particles of resin are suspended in water. These emulsions may be used as coatings such as paints, printing inks, etc.

Thus, this invention is also concerned with a water-reducible coating composition obtained by adding the dye compositions described hereinbefore to the resin emulsion such that the final emulsion composition consists essentially of from 0.01% to 95% by weight, based on the polymeric solids content of resin emulsion and from 0.01% to 40% of a dye which is soluble in water-miscible solvents and insoluble solely in water.

Examples of acrylic resin amulsions which may be used in this aspect of the invention are those described in U.S. Pat. No. 3,023,177.

In order that the present invention may be more completely understood, the following examples are set forth in which all parts are parts by weight unless otherwise indicated. The following examples are presented only to illustrate and disclose, and are not to be construed as limiting.

EXAMPLE 1

20 parts of C.I. Solvent Red 8 (C.I. Constitution 12715) was added to 80 parts of ethylcellosolve. The dye solution was heated in a hot water bath and mixed on a paint shaker for ten minutes.

10 parts of this dye solution was added with stirring into 100 parts of each of the following three resin solutions:

1. Rosin
   formulation: 20 parts Pentalyn 255, Hercules Chemical Co.
   20 parts ethanol
   4 parts dimethylaminoethanol
   56 parts water
2. Melamine resin
   formulation A: 20 parts melamine resin Cymel 303, American Cyanamid
   20 parts isopropanol
   60 parts water
   formulation B: 20 parts melamine resin Cymel 303, American Cyanamid
   20 parts isopropanol
   1 part dimethylaminoethanol to raise pH to about 10
   59 parts water
3. Acrylic resin
   formulation: 50 parts acrylic resin Zinpol 1519E, Zinchem
   50 parts water In each of the resin formulations, water-soluble ink compositions were prepared.

In a similar manner, when the following solvent soluble dyes were added to each of the above-mentioned resin formulations, water-soluble ink compositions were obtained:

| Rye | | Company | C.I. Solvent | |
|---|---|---|---|---|
| Yellow | 2R | American Cyanamid | Yellow | 13 |
| | 5GLS | Sandoz | | 64 |
| | RLS | | | 63 |
| | 2RLS | | | 62 |
| | CG | BASF | | 79 |
| | GR | | | 81 |
| | R | | | 82 |
| | 3GW | CIBA-GEIGY | | 95 |
| | 3GLG | | | 48 |
| | 2GL | | | 88 |
| | 2RLN | | | 89 |
| | 3R | | | 25 |
| Orange | R | American Cyanamid | Orange | 20 |
| | RLS | Sandoz | | 41 |
| | G | BASF | | 56 |
| | RE | | | 54 |
| | GMG | CIBA-GEIGY | | 27 |
| | G | | | 11 |
| | RLN | | | 59 |
| | 2R | | | 9 |
| Red | B | GAF | Red | 33 |
| | 3BA | | | 35 |
| | BE | | | 8 |
| | B | American Cyanamid | | 106 |
| | 2G | | | 115 |
| | GE | BASF | | 122 |
| | BL | | | 119 |
| Bordeaux | B | | | 118 |
| Red | BLSN | Sandoz | | 90 |
| | 3BLS | | | 91 |
| Scarlet | RLS | | | 92 |
| Red | 3GL | CIBA-GEIGY | | 130 |
| Scarlet | GLN | | | 131 |
| Red | 2BL | | | 132 |
| | G | | | 125 |
| | B | | | 7 |
| | 2B | | | 9 |
| Pink | 5BLG | | | 127 |
| Scarlet | CR | GAF | | 31 |
| Violet | RN | CIBA-GEIGY | Violet | 24 |
| | 3BN | | | 1 |
| Blue | THN | American Cyanamid | Blue | 38 |
| | FLE | BASF | | 70 |
| | GLS | Sandoz | | 46 |
| | RLS | | | 45 |
| | BLN | CIBA-GEIGY | | 49 |
| | GN | | | 67 |
| | 2GLN | | | 48 |
| | 2RB | | | 53 |
| Brown | GN | American Cyanamid | Brown | 38 |
| | GLS | Sandoz | | 28 |
| | RLS | | | 31 |
| Brown | 2RG | CIBA-GEIGY | Black | 2 |
| | 2GL | | Brown | 42 |
| | GR | | | 34 |
| | 2RL | | | 43 |
| | 5R | | | 35 |
| | 6RL | | | 44 |
| Black | RB | American Cyanamid | Black | 26 |
| | RE | BASF | | 27 |
| | BA | CIBA-GEIGY | | 6 |
| | CN | | | 28 |
| | RL | | | 29 |

EXAMPLE 2

20 parts of C.I. Solvent Yellow 13 was added to 80 parts of ethylcellosolve. The dye solution was heated in a hot water bath and mixed on a paint shaker for ten minutes.

20 parts of this solution was added with stirring to 100 parts of distilled water. The dye remains soluble in the solution and this dye solution was successfully used as an aqueous wood stain.

In a similar manner when the following solvent soluble dyes were added to ethylcellosolve, water-soluble wood stains were obtained:

| Dye | C.I. Solvent No. |
|---|---|
| Yellow 2R | Yellow 13 |
| 3GW | Yellow 95 |
| Red 3GL | Red 130 |
| Red B | Red 7 |
| Red 2B | Red 9 |

-continued

| Dye | C.I. Solvent No. |
| --- | --- |
| Orange 2R | Orange 9 |
| Brown 2GL | Brown 42 |
| 2RG | Black 2 |
| GR | Brown 34 |
| 6RL | Brown 44 |
| 2RL | Brown 43 |
| 5R | Brown 35 |
| Black RL | Black 29 |
| Black BA | Black 6 |

Aqueous wood stains are also obtained when other water-miscible solvents, for example, methyl-ethylketone are used in place of ethylcellosolve.

EXAMPLE 3

20 parts of Orasol Pink 5BLG (C.I. Solvent Red 127) was added to 10 parts of the surfactant, the sodium salt of sulfonated naphthalene formaldehyde (Tamol L Concentrate by Rohm & Haas), 10 parts dimethylaminoethanol and 60 parts of ethylcellosolve. This dye solution may be used to color water-soluble inks or paints. For example, when 20% of the above prepared solution is added to 95% of a latex paint (Devoe Acrylic Latex Housepaint 1249-01), the dye did not precipitate from solution.

In place of the surfactant in the above example, a water-soluble resin such as an acrylic resin may be used to prepare the water-soluble dye solution.

Whate is claimed is:
1. A water-soluble composition comprising
   a. 0.01% to 40% of a dye which is soluble in water-miscible solvents and insoluble solely in water;
   b. 1.0% to 88% of a water-miscible solvent or mixture of solvents which is inert to said dye;
   c. 0.1% to 89% of a water-soluble resin;
   d. 10% to 98% water; and optionally, a basic compound to raise the pH of the solution to about 10.
2. A water-soluble composition according to claim 1 wherein said water-miscible solvent is selected from the group consisting of an alkanone, an alkanol, an alkoxyalkanol, an aminoalkanol alkoxyester, and an alkylene glycol.
3. A water-soluble composition according to claim 1 wherein said water-soluble resin is selected from a polyacrylate, aminoplast or rosin.
4. A water-soluble composition according to claim 1 wherein said dye is a metal complex azo dye.
5. A water-soluble composition according to claim 2 wherein said water-miscible solvent is selected from the group consisting of acetone, methylethylketone, ethanol, isopropanol, ethylcellosolve, cellosolve acetate, and dimethylaminoethanol.
6. A water-soluble composition according to claim 3 wherein said aminoplast is hexamethoxymethylmelamine.
7. A water-soluble composition according to claim 4 wherein said metal is selected from the group consisting of cobalt, nickel, chromium and copper.
8. A method of preparing a water-soluble dye composition which comprises
   1. dissolving a dye in a water-miscible solvent, said dye being characterised in the Colour Index as a solvent soluble dye and one which is insoluble solely in water, and
   2. adding said dye solution to a solution containing a water-soluble resin dissolved in water; and optionally adding a basic compound to raise the pH of the solution to about 10; or
   1. dissolving a dye and water-soluble resin in a water-miscible solvent, said dye being characterised in the Colour Index as a solvent soluble dye and one which is insoluble solely in water; and
   2. adding water to the dye solution; and optionally adding a basic compound to raise the pH of the solution to about 10.
9. A method according to claim 8 wherein said water-miscible solvent is selected from the group consisting of an alkanone, an alkanol, an alkoxyalkanol, an aminoalkanol, and an alkylene glycol.
10. A method according to claim 8 wherein said water-soluble resin is selected from a polyacrylate, aminoplast, or rosin.
11. A method according to claim 8 wherein said dye is a metal azo complex.
12. A method according to claim 9 wherein said water-miscible solvent is selected from the group consisting of acetone, methylethylketone, ethanol, isopropanol, ethylcellosolve, and dimethylaminoethanol.
13. A method according to claim 10 wherein said aminoplast is hexamethoxymethylmelamine.
14. A method according to claim 11 wherein said metal is selected from the group consisting of cobalt, nickel, chromium and copper.

* * * * *